Patented Aug. 7, 1923.

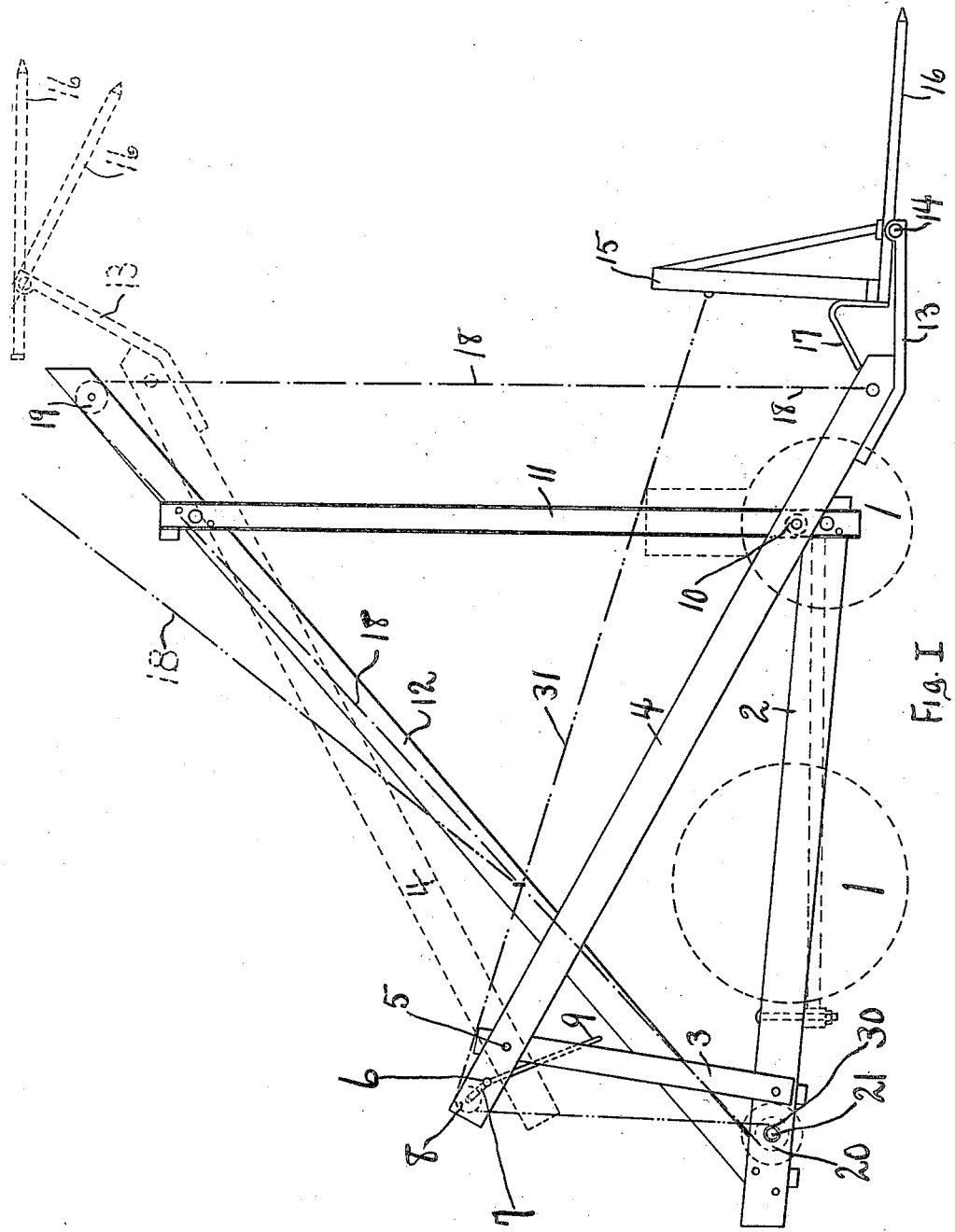

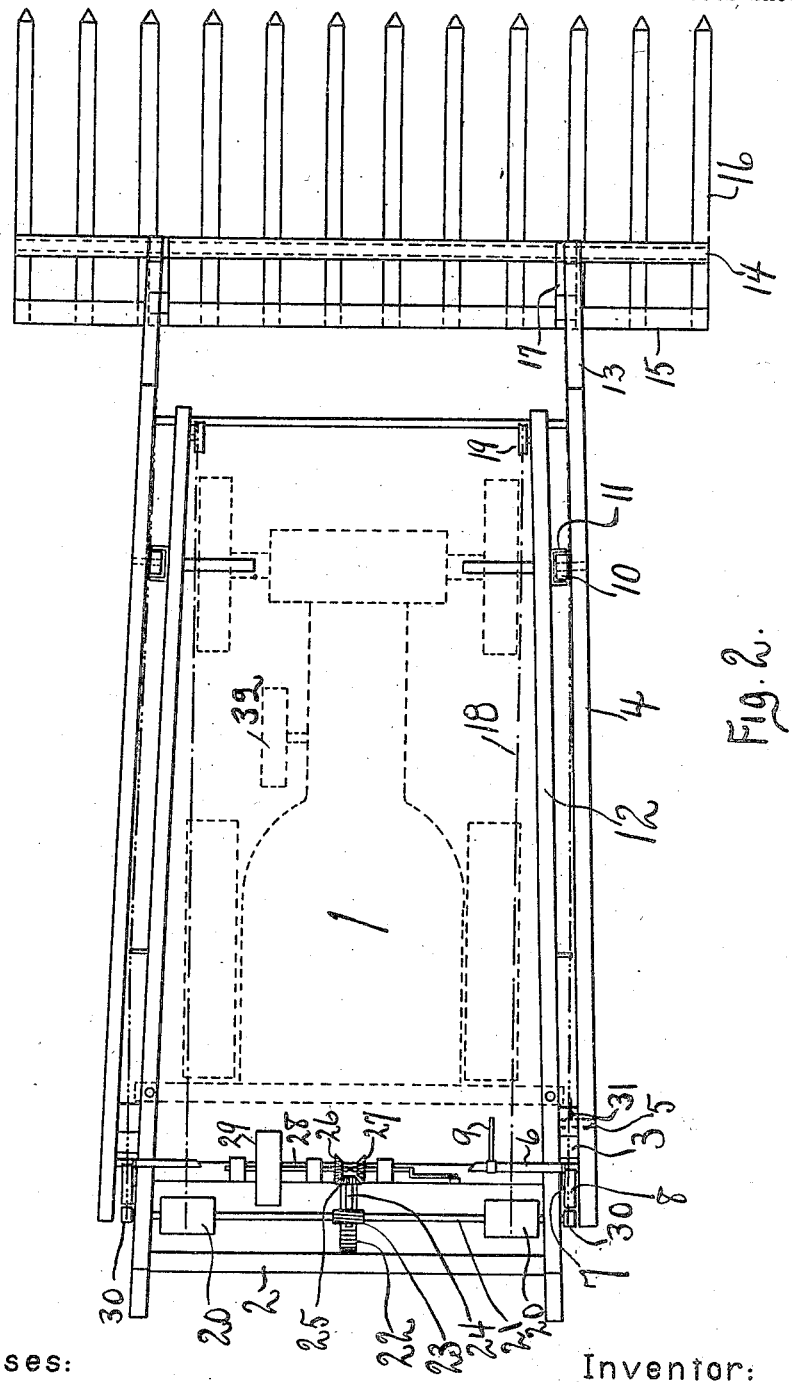

1,463,928

UNITED STATES PATENT OFFICE.

CHARLES W. SIEMERS, OF CEDAR POINT, ILLINOIS.

PUSH RAKE.

Application filed December 20, 1920. Serial No. 432,147.

*To all whom it may concern:*

Be it known that I, CHARLES W. SIEMERS, a citizen of the United States, residing at Cedar Point, in the county of La Salle and State of Illinois, have invented a new and useful Push Rake, of which the following is a specification.

My invention relates to improvements in push rakes in which the rake is operated by means of a tractor or other self propelled vehicle; and the object of my improvement is to produce a simple and inexpensive rake that can readily be attached to any tractor or self-propelled vehicle and one that is very effective, readily understood and easily operated and does not shatter the dry leaves of the alfalfa or clover hay from the coarser stems of the hay as is done by ordinary hay loaders.

I attain these objects by the mechanism illustrated in the accompanying drawing, in which—

Figure 1 is a side view of my push rake.

Figure 2 is a top view of my push rake.

Similar numerals refer to similar parts through the several views.

In the drawings 1 represents the tractor or self-propelled vehicle, 2 are the sides of a frame fastened to 1 by any of the usual well known means. A bar 3 is pivotally connected to each side of the frame 2 as shown and is further pivotally connected to a bar 4 at a point 5 adjacent to one end of said bar. Journaled in bars 4 adjacent to said point 5 is a shaft 6 from which project two arms 7 on each of which is a rope pulley or sheaf 8. Shaft 6 also has a controlling arm 9 which is adjustably held in position by hand or by any of the usual means employed for such purposes. Bar 4 has rotatably mounted upon it a roller 10 which runs on the inside of a channel beam 11 which is fastened to frame 2 and held in the vertical position by means of a strut 12 which is fastened to the upper end of 11 and also to the frame 2 as shown. It is evident from the preceding description that the bars 3 and 4 form a linkage system so that the bar 4 can be raised to the dotted position shown. Fastened to the forward end of 4 is a member 13 at whose outer end is journaled a shaft 14 on which is mounted the large rake 15 having the long teeth 16 and a member 17 which positions the rake 15 in its lower or loading position as shown.

Fastened to the end of bar 4 adjacent to the rake 15 is a cable or rope 18 which passes over a sheave pulley 19 mounted on the upper end of 12 and then to a drum 20 mounted on a shaft 21 which is journaled in the frame 2 and which is rotated in either direction by any of the usual means employed for such purposes, one of which I have indicated as comprising worm wheel 22 mounted on said shaft 21. Worm wheel 22 is driven by the worm 23 on shaft 24 which carries a bevel gear 25. Adjacent to bevel gear 25 and on either side of same are bevel gears 26 and 27 which are slidably mounted on but rotatively connected with shaft 28 which is journaled in frame 2 as shown. Mounted on shaft 28 is a pulley 29 which is belted to the pulley 32 on the tractor, which belt is not shown in the drawings. Sliding bevel gear 26 into mesh with bevel gear 25 will rotate the drums 20 in one direction to raise the rake, while sliding bevel gear 27 into mesh with said bevel gear 25 will rotate the drums in the other direction to lower the rake. Mounted on shaft 21 is a smaller drum 30 to which is fastened a rope or cable 31 which passes up over the above mentioned pulley 8 and is fastened to the upper part of rake 15, so that the position of rake 15 relative to bar 4 is controlled by means of said cable, for instance if the cable 31 is let slack the teeth 16 of the rake will drop downward and the load on them will slide or drop off. Cables 18 and 31 are so wound on the respective drums that when cable 18 is raising the rake 15 the cable 31 is being paid out to keep the rake teeth in a practically horizontal position as the rake is raised. When the rake is raised and it is desired to drop or slide the load of hay from the rake the pulley 8 is moved by means of the handle 9 approximately 90° toward the rake which it is evident puts enough slack in the rope or cable 31 to cause the rake 15 to tip downwardly on shaft 14 to let the load slide or drop off, thereby emptying the rake of its load. To bring the rake again into its loading position the pulley 8 is again moved into the position shown in Figure 1.

In operating my invention the tractor is run forward until the rake is filled with the hay or other material to be loaded, then is taken to the stack or wagon to be loaded and the rake then elevated and positioned over said stack or load and the pulley 8 tripped as above mentioned which deposits the hay from the rake to the stack or load, when the rake is then again positioned in its loading position as above described and again lowered to receive its load and repeat the process of loading.

While I have here shown one form of my invention it will be understood of course, that I do limit myself to the exact form shown, but wish to have it taken in a sense illustrative of any of the forms set forth in my claims.

I claim:—

1. In a push rake, a self-propelled vehicle, a frame mounted on said vehicle, a bar, a link pivotally connected to said frame and said bar, a rake pivotally mounted on the end of said bar, a roller journaled on said bar, members for guiding said roller, means mounted on the frame connected to the rake for raising and lowering same and means for maintaining said rake in its loaded position and mechanism for tripping the rake to discharge its load.

2. In a push rake, a self-propelled vehicle, a frame mounted on said vehicle, a bar, a link pivotally connected to said frame and said bar, a rake pivotally mounted on the end of said bar, a roller journaled on said bar, members for guiding said roller, means mounted on the frame connected to the rake for raising and lowering same and compensating means for maintaining said rake in its loaded position and mechanism for tripping the rake to discharge its load.

CHARLES W. SIEMERS.

Witnesses:
 WM. J. WENDT,
 OTTO J. LOEKE.